United States Patent Office 3,813,443
Patented May 28, 1974

3,813,443
BOLL WEEVIL SEX ATTRACTANT
Richard C. Gueldner, Starkville, James H. Tumlinson III, West Point, and Dicky D. Hardee, Paul A. Hedin, and Alonzo C. Thompson, Starkville, and James P. Minyard, State College, Miss., assignors to the United States of America as represented by the Secretary of Agriculture
No Drawing. Original application Nov. 18, 1970, Ser. No. 90,794. Divided and this application Apr. 27, 1972, Ser. No. 248,185
Int. Cl. C07c 49/45
U.S. Cl. 260—586 R                                         1 Claim

ABSTRACT OF THE DISCLOSURE

Synthetic routes to each of four critical components of the boll weevil sex attractant complex are described. Effective mixtures of the several components equal to or better than the natural attractant are disclosed.

This is a division of application Ser. No. 90,794, filed Nov. 18, 1970.

A non-exclusive, irrevocable, royalty-free license in the invention herein described, throughout the world for all purposes of the United States Government, with the power to grant sublicenses for such purposes, is hereby granted to the Government of the United States of America.

This invention relates to the control of boll weevil infestations, particularly in cotton, by utilization of a synthetic mixture of components which are identical to, or simulate, in chemical structure, the natural components elaborated by the insects as a sex attractant and aggregant.

The main object of the instant invention is to provide a means of concentrating an insect population so that pesticidal or biological means of control are more efficient, more specific to the target insect, and less likely to cause damaging ecological disturbance of other species. In particular this invention concerns the control of the boll weevil in cotton fields.

Another object of the instant invention is to provide a novel, effective means of boll weevil control which constitutes an improvement over existing methods of control.

A third object of the instant invention is the elucidation of the structures of the natural sex attractant/aggregant components.

A fourth object is the disclosure of a process for synthesis of key precursors and the final compounds which make up the sex attractant/aggregant complex.

A fifth object is the formulation of a mixture of the synthetic compounds which has attractant power simulating or surpassing the live male insects.

The boll weevil is the most serious pest of cotton in the United States, necessitating the use of about $75 million worth of insecticides in 1968 and causing an estimated annual loss of $375 million. The larval stage of the insect developing in the cotton bud causes loss of the fruit and consequent decrease in fiber production. The life cycle of the insect is completed when the adult male, feeding on the cotton plant, elaborates the compounds composing the sex attractant/aggregat complex, fertilizes the eggs of the adult females lured by the scent, and the fertilized eggs are deposited in the cotton bud.

Insecticides have been used to control the insect population by broadcast application over entire fields. The increased resistance of the insect survivors' progeny require higher levels of insecticide per acre to maintain comparable control from year to year. The widespread application of insecticides may harm beneficial insects, birds, and fish from the resulting environmental pollution.

It has been demonstrated that attractancy of adult male weevils to female weevils and to both sexes exists during the spring and fall. Furthermore it has been shown that this attractancy can be extracted from the boll weevils and from the insect feces.

We have found that the extract components responsible for the attractancy isolated and identified by chemical and spectral means, are cis-2-isopropenyl-1-methylcyclobutaneethanol, I, cis-3,3-dimethyl-$\Delta^{1,\beta}$-cyclohexaneethanol, II, cis-3,3-dimethyl-$\Delta^{\alpha}$-cyclohexaneacetaldehyde, III, and trans-3,3-dimethyl-$\Delta^{1,\alpha}$-cyclohexane-acetaldehyde, IV.

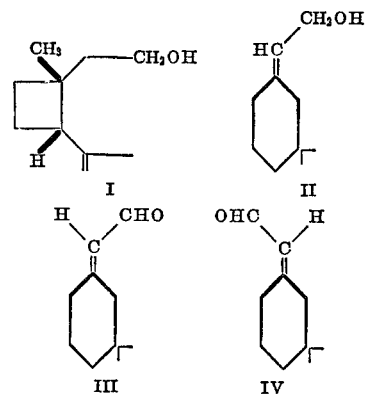

When the above four compounds (synthesized as shown in the examples which follow) are combined in an optimum ratio, females respond equally or better than they respond to live male weevils in laboratory bioassays.

EXAMPLES

Synthesis of compound I and isomers

Isoprene (150 ml.), methyl vinyl ketone (75 ml.), and acetaphenone (20 ml.) were placed in a 250 ml. reaction vessel which contained a high pressure, quartz, 450 watt, mercury vapor photochemical immersion lamp inserted in a quartz well which well was cooled with water to about 5° C. A Pyrex cylinder filter surrounded the lamp. The mixture was irradiated with light from the inserted lamp for about 144 hrs. During this time considerable polymer formed and it was necessary to remove the polymer from the quartz well once every 48 hrs. At the end of 144 hrs. the mixture was fractionated on a Nester-Faust spinning-band distillation apparatus.

The fraction containing compounds V, VI, and VII, was further purified by column chromatography on silica gel to remove the hydrocarbons which codistilled with the ketones. The ketones were then separated by preparative GLC on Carbowax 4000 and SE–30.

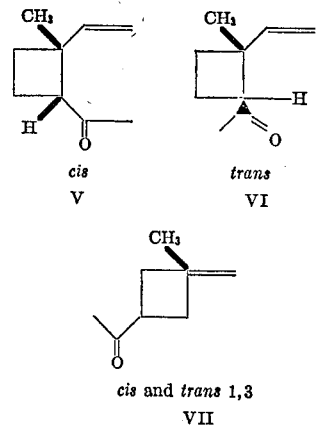

Structures were determined by NMR, IR, and mass spectroscopy.

Elemental analyses are: Calcd.: C, 78.21; H, 10.21. Found: C, 78.08; H, 10.14.

Methyl magnesium iodide was prepared in the usual manner in dry ether. The appropriate ketone (V, VI, or VII) in dry ether was added drywise to a slight molar excess of MeMgI, cooling, if necessary in a water bath. After addition of the ketone was complete, the reaction mixture was refluxed gently for 1 hr. It was then cooled in ice-water and a saturated $NH_4Cl$ solution was added slowly until no further reaction occurred. This was evident by formation of a white precipitate and no foaming on addition of more $NH_4Cl$ solution. The mixture was allowed to stand 30 minutes, the ether decanted, and the contents of the flask washed twice with ether. The combined ether extracts were dried over $Na_2SO_4$ or alternatively $MgSO_4$, the ether evaporated, and the products purified by GLC. Ketones V, VI, and VII yielded alcohols VIII, IX, and X respectively.

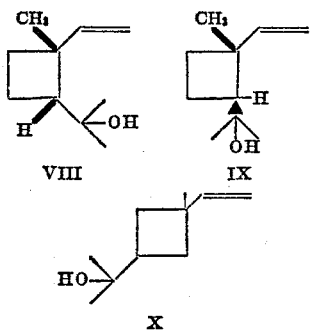

Structures were determined by NMR, IR, and mass spectroscopy.

Elemental analyses are: VIII: Calcd. for $C_{10}H_{18}O$: C, 77.87; H, 11.76. Found: C, 77.92; H, 11.92.

The appropriate tertiary alcohol, VIII, IX, or X was placed in a 3 neck round bottom flask equipped with a condenser and magnetic stirrer. Dry $N_2$ was introduced in one side arm and removed through the condenser which was connected to an acetone wash bottle to remove excess $B_2H_6$. The center neck of the flask was fitted with a rubber septum through which samples and reagents were introduced by means of syringes. A conventional hydroboration reaction was then carried out as follows. To 0.03 mole of the alcohol in the flask was added 0.009 mole of sodium borohydride in diglyme (0.0 ml. of 1.0 M solution in diglyme). To this 0.012 mole of freshly distilled $BF_3$ ethecate was added slowly.

A static pressure of $N_2$ was maintained during the reaction. The reaction mix was allowed to stand at room temperature 1 hr. and then hydrolyzed with 2 ml. $H_2O$. When $H_2$ was no longer evolved 4 ml .of 3 N NaOH was added and then 4 ml. of 30% $H_2O_2$ dropwise so as to maintain a gentle reflux. The reaction was allowed to cool, and ether was added to the flask. Solid NaOH was added to form a layer in the bottom of the flask. The ether was decanted and the flask washed twice more with ether. The ether extracts were combined, the ether evaporated, and the diols purified by GLC for analysis. Tertiary alcohols VII and IX yielded diols XI and XII respectively.

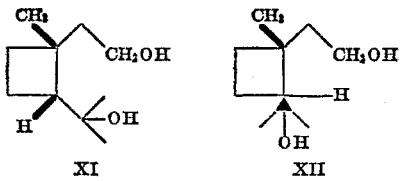

Alcohol X which probably also consisted of a mixture of cis and trans isomer yielded two diols, XIII and XIV.

The structures of the diols were determined by NMR, IR, and mass spectroscopy.

The diols in diglyme were dehydrated without purification. A slight molar excess of acetic anhydride was added to the diglyme solution of the alcohol and the mixture was refluxed for 3 hours. During this time samples were removed for GLC analysis to determine the extent of progress of the reaction. Initially, a peak with a much longer retention time on SE-30 replaced the diol peak and then this gradually disappeared with another peak with retention time near that of the diol arising.

Reduction of this mixture with $LiAlH_4$ yields the primary unsaturated alcohol. Thus the following sequences of reaction produce the products indicated.

V ⟶ VIII ⟶ XI ⟶ I

VI ⟶ IX ⟶ XII ⟶ trans V

VII ⟶ X ⟶ XIII + XIV ⟶ XV + XVI

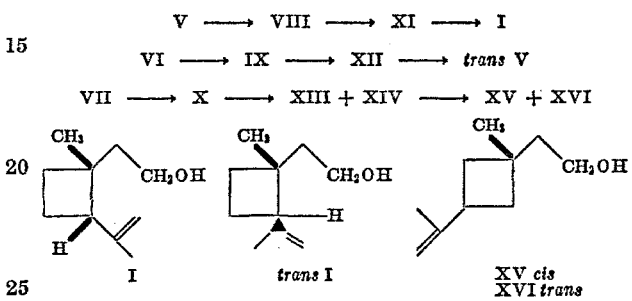

Structures were confirmed by NMR, mass, and IR spectral studies.

Elemental analyses are: Calcd. for $C_{10}H_{18}O$: C, 77.87; H, 11.76. Found: C, 77.63; H, 11.70.

Compound I is identical in every way, including biological activity to the natural component of the sex attractant isolated from weevils and their fecal material.

3,3-dimethylcyclohexanone 3,3 - dimethylcyclohexanone was prepared from 3-methyl-2-cyclohexene-1-one by the method of Büchi et al., as reported in Helv. Chim. Acta, 31 p. 241 (1948) which method involves a Grignard reaction applied to a ketone the keto grouping of which is part of a conjugated system.

Methyl magnesium iodide in ether together with cuprous chloride was reacted with 1-methyl-cyclohexeone-3. The Grignard complex was decomposed with dilute hydrochloric acid and the saturated ketone product 3,3-dimethylcyclokexanone isolated and worked up in the usual manner.

Ethyl-(3,3-dimethyl-1-hydroxycyclohexyl)acetate

To 48.5 g. (0.743 moles) zinc was added, with heating and stirring, a mixture of 124.2 g. (0.742 moles) of ethylbromoacetate and 31.3 g. (0.248 moles) of 3,3-dimethylcyclohexanone in 300 ml. dry benzene. After the addition period of 1.5 hrs., the mixture was stirred and refluxed for 5 hrs. The flask was cooled in an ice bath and 450 ml. of 10% sulfuric acid was added. In a separatory funnel the aqueous layer was removed from the benzene layer. The benzene layer was washed alternately with 5% sulfuric acid and 10% sodium carbonate solutions, and finally with water. The benzene solution was dried over sodium sulfate and the benzene was removed by distillation. The residue of 59.2 g. was distilled in vacuo to yield 31.7 g. (59.6%) boiling at 112–113° C. at 5.4 mm. Hg.

Analysis.—Calcd. for $C_{12}H_{22}O_3$: C, 67.25; H, 10.35. Found: C, 67.22; H, 10.32.

3,3-dimethyl-1-hydroxycyclohexyl acetic acid

To 20 g. potasium hydroxide in 100 ml. water was added 15.0 g. (0.07 moles) of ethyl - (3,3 - dimethyl-1-hydroxycyclohexyl) acetate. The mixture became homogeneous in three hours. After extraction with ether the aqueous basic solution was acidified and the precipitated acid was collected by filtration and dried over phosphorus pentoxide for 16 hours. The dried acid was recrystallized from benzene to give 11.0 g. (84.6%), M.P. 109–110° C.

Calculated for $C_{10}H_{18}O_3$: C, 64.49; H, 9.74. Found: C, 64.55; H, 9.75.

Dehydration of 3,3-dimethyl-1-hydroxycyclohexylacetic acid

The hydroxy acid (43.2 g.) was refluxed in 170 ml. acetic anhydride for 5½ hrs. Most of the acetic anhydride was then removed by distillation. Part of the residue (33.4 g.) was subjected to basic hydrolysis in 20% KOH for 30 minutes. The basic solution was cooled and acidified and then extracted with chloroform. The chloroform extract was dried and concentrated to 24.0 g. Crystallization of the 24.0 g. from pentane yielded 15.1 g., M.P. 60–85° C., a mixture of isomers of the unsaturated acids.

Esterification of the unsaturated acids

Method A.—Ethyl esters: The crude product (3 g.) from the dehydration of the hydroxy acid was placed in absolute ethanol containing 7% $H_2SO_4$. The mixture was allowed to stand overnight at room temperature, then refluxed for 5 hrs., cooled and brought to neutrality with 10% NaOH. The ethanol was removed on a rotary evaporator and the aqueous mixture was extracted with ether. The ether extract was dried and concentrated. The *cis* and *trans* exocyclic unsaturated esters were purified by gas liquid chromatography and identified by their NMR spectra and analyzed for carbon and hydrogen.

Calculated for $C_{12}H_{20}O_2$: C, 73.42; H, 10.27. Found for *cis* ester: C, 73.55; H, 10.38. Found for *trans* ester: C, 73.42; H, 10.39.

Method B.—Methyl esters: The mixed unsaturated acids 28.4 g. were dissolved in ether and treated with excess diazomethane in 300 ml. ether. The ether was removed by distillation and the residue was distilled twice to yield 12.9 g. of mixed esters in five fractions. The five fractions were combined and distilled through an efficient column to yield 4.5 g. of pure *cis* ester and 1.0 g. of pure *trans* ester.

Reduction of the unsaturated esters with lithium aluminum hydride

The ethyl esters of both *cis* and *trans* esters were reduced and isolated in a similar manner according to the following procedure:

The ethyl ester of the *cis* unsaturated acid collected from gas-liquid chromatography (about 100 mg.) was added to 1 g. of $LiAlH_4$ in 50 ml. of ether after the ether-hydride mixture had been refluxed for 1 hr. The mixture was refluxed for 1.5 hrs., cooled, and the excess hydride decomposed with 10% NaOH. The ether solution of the alcohol was filtered, concentrated, and purified by gas-liquid chromatography. Infrared and NMR spectra showed the product to be identical with compound II, *cis*-3,3-dimethyl-$\Delta^{1,\beta}$-cyclohexamethanol.

Calculated for $C_{10}H_{18}O$: C, 77.86; H, 11.76. Found for *cis* alcohol: C, 77.81; H, 11.79. Found for *trans* alcohol: C, 77.64; H, 11.83.

Oxidation of *cis* and *trans* alcohols to the corresponding aldehydes

The example given is for the *cis* alcohol but the procedure is exactly the same for the *trans* alcohol also.

Active $MnO_2$ was prepared as per Attenburrow et al., J. Chem. Soc., 1094 (1952). A mixture of 100 mg. of the alcohol and 3.3 g. of active $MnO_2$ in 30 ml. pentane was stirred for 30 minutes at 0° C. The mixture was filtered, most of the pentane removed, and the product analyzed by gas-liquid chromatography. Chromatographically pure samples were examined by NMR, mass, an infrared spectrometry and bioassayed for activity.

The overall synthesis scheme for the unsaturated alcohol (component II) and the *cis* and *trans* unsaturated aldehydes (components III and IV, respectively) is shown in Figure 1.

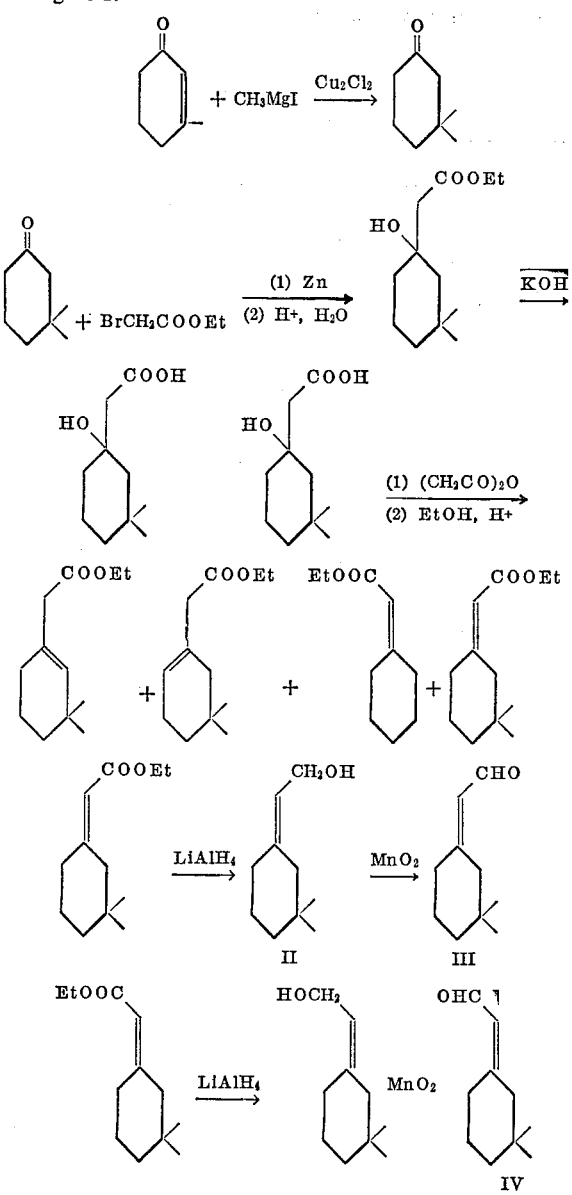

FIGURE 1.—SYNTHESIS SCHEME

As an example of the activity (in the laboratory bioassay) of the single components and *cis* mixtures, Table 1 summarizes the activity at optimum concentrations.

TABLE 1[1]

| Sample | Amount (μg.) | Average T/S |
|---|---|---|
| I | 0.09 | 0.11 |
| II | 0.07 | 0.06 |
| III | 0.12 | 0.00 |
| IV | 0.12 | 0.11 |
| I, II | 0.09, 0.07 | 0.15 |
| I, III | 0.09, 0.12 | 0.06 |
| I, IV | 0.09, 0.12 | 0.12 |
| II, III | 0.07, 0.12 | 0.24 |
| II, IV | 0.07, 0.12 | 0.12 |
| III, IV | 0.12, 0.12 | 0.16 |
| I, II, III | 0.09, 0.07, 0.12 | 1.00 |
| I, II, IV | 0.09, 0.07, 0.12 | 0.84 |
| I, III, IV | 0.09, 0.12, 0.12 | 0.07 |
| II, III, IV | 0.07, 0.12, 0.12 | 0.18 |
| I, II, III, IV | 0.09, 0.07, 0.12, 0.12 | 1.26 |
| Trans I and II, III, IV | 0.09, 0.07, 0.12, 0.12 | 1.10 |

[1] Female boll weevil response, in laboratory bioassays, to optimum concentrations of compounds I, II, III, IV. T/S equals net response to test sample divided by net response to a standard. The sample in each case consists of the compound, or a mixture of the compounds indicated, in 0.2 ml. dichloromethane. The standards used were live male boll weevils or steam distillates which were equivalent in attractancy to live males.

Examples of formulations

The four synthetic components combined in 0.2 ml. dichloromethane solution in a ratio 0.09 μg., 0.12 μg., 0.12 μg., I, II, III, IV were applied to (1) firebrick, (2) fiberboard, (3) cardboard, and these materials were used in laboratory bioassays. Another formulation for laboratory bioassay involved the placement of the dichloromethane solution in a sealed polyethylene container.

For field studies the synthetic components were presented as follows:

(1) Absorbed on firbrick.

(2) Absorbed on fiberboard.

(3) A pipette containing the dichloromethane solution with a cotton wick protruding from the pipette.

(4) The frass of weevil is treated with the dichloromethane solution.

We claim:

1. The *cis* isomeric compound represented by the structure

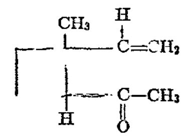

References Cited

UNITED STATES PATENTS

| | | | |
|---|---|---|---|
| 3,240,821 | 3/1966 | Ohloff et al. | 260—586 R X |
| 3,361,820 | 1/1968 | White et al. | 260—586 X R |
| 3,485,798 | 12/1969 | Smith | 260—586 R X |

LEON ZITVER, Primary Examiner

N. MORGENSTERN, Assistant Examiner

U.S. Cl. X.R.

260—468 L, 488 R, 598, 514 K, 514 L, 617 R, 617 C; 424—331